United States Patent [19]

Carré

[11] Patent Number: 4,480,526

[45] Date of Patent: Nov. 6, 1984

[54] BRAKING ASSISTANCE SERVOMOTOR WITH A FORCE AMPLIFICATION SYSTEM BETWEEN THE PISTON AND THE OUTPUT MEMBER

[75] Inventor: Jean-Jacques Carré, Le Raincy, France

[73] Assignee: Societe Anonyme D.B.A., Paris, France

[21] Appl. No.: 529,174

[22] Filed: Sep. 2, 1983

[30] Foreign Application Priority Data

Sep. 30, 1982 [FR] France ................................ 82 16451

[51] Int. Cl.³ ........................... F15B 9/10; F01B 9/00
[52] U.S. Cl. .................................. 91/374; 91/369 A; 92/137; 74/517
[58] Field of Search ........................... 92/137; 74/517; 91/369 A, 376 R, 374, 383; 60/547.1

[56] References Cited

U.S. PATENT DOCUMENTS

| | | | |
|---|---|---|---|
| 2,724,982 | 11/1955 | Sanft | 74/517 |
| 4,086,842 | 5/1978 | Kytta | 91/391 A |
| 4,186,650 | 2/1980 | Kytta | 91/369 A |
| 4,387,626 | 6/1983 | Myers | 91/376 R |

*Primary Examiner*—Paul E. Maslousky
*Attorney, Agent, or Firm*—Larry J. Palguta; Ken C. Decker

[57] ABSTRACT

The servomotor comprises a piston assembly (9) provided with a tubular hub (25) sliding on a valve sleeve (11) provided with a return roller (51) for a flexible elongate member (40) fixed between an end wall (4', 43) of the casing and an arm (47, 48) of the piston assembly normally extending beyond the return roller (51), between the latter and said end wall.

13 Claims, 2 Drawing Figures

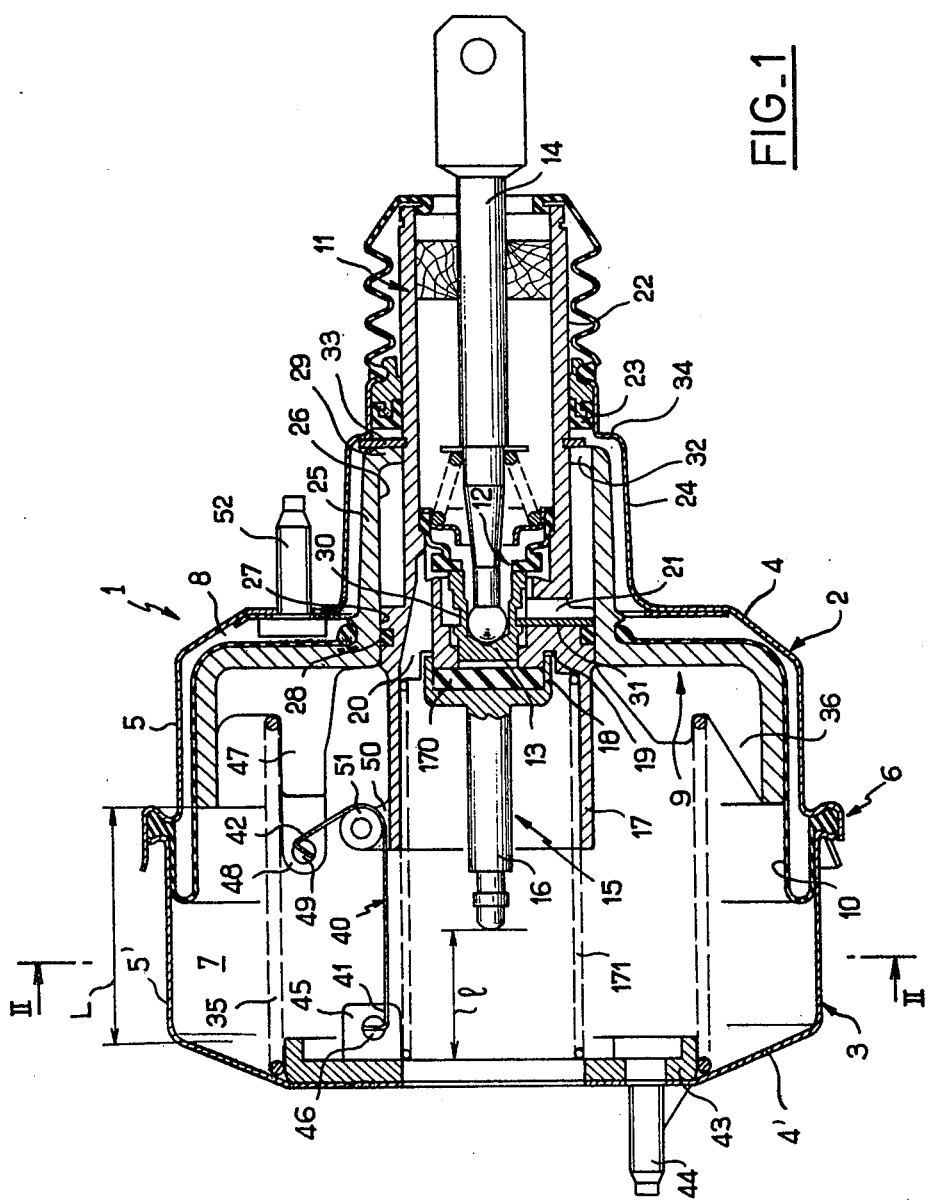
FIG_1

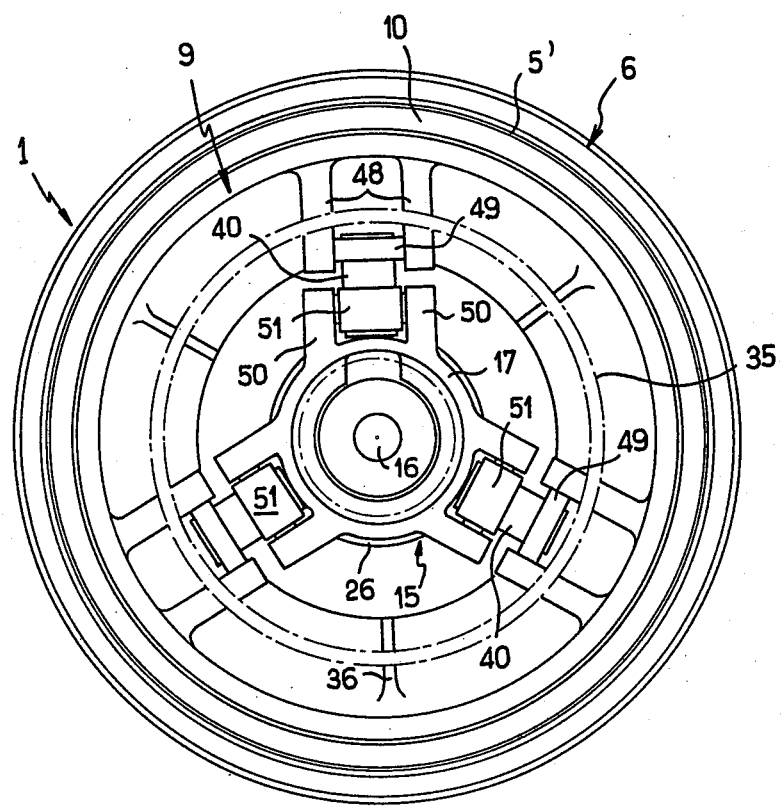
FIG_2

BRAKING ASSISTANCE SERVOMOTOR WITH A FORCE AMPLIFICATION SYSTEM BETWEEN THE PISTON AND THE OUTPUT MEMBER

The present invention concerns braking assistance servomotors and, more particularly, servomotors of the type comprising a casing, an assistance piston assembly displaceable in the casing and dividing the latter into two chambers, an output member actuatable by the piston assembly and intended to be connected to the piston of a master cylinder, an input member, intended to be connected to the brake pedal of a motor vehicle, a valve means actuatable by the input member to selectively control a pressure differential between the two chambers, and an articulated force amplification system connecting the piston assembly to the output member.

Assistance servomotors of this type are described for example in German Patent Application No. 2,304,834 and in U.S. Pat. No. 4,186,650.

In the above documents, the force amplification system embodies a pivoted lever means positioned in one or the other of the chambers in the casing, necessitating for this reason articulated anchorages for the lever and the mechanisms for articulating or applying reaction and for transmitting force, not only on both the output member and the assistance piston assembly, but also on the casing itself, with resulting disadvantages.

One object of the present invention is to provide a braking assistance servomotor or booster of the type mentioned above allowing a reduction of the maximum overall cross-section of the casing and thus a significant reduction of the distortion of this casing under load, by putting into operation a force amplification system with reduced weight and inertia, in which the likelihood of seizure or jamming is eliminated, and permitting a progressive amplification of force and silent operation.

In order to meet this object, according to a feature of the present invention, in a servomotor of the above mentioned class, the force amplification system consists of at least one flexible elongate member having its ends fixed to the piston assembly and to the casing respectively, and rolling partially folded back around a return member mounted on the valve sleeve.

Another object of the present invention is to provide a servomotor of the type defined above, allowing direct actuation of the output member by the input member, typically via a reaction member, in the event of failure of the pneumatic pressure system, without necessitating the inoperative piston assembly to be moved during this actuation.

For doing this, according to another feature of the invention, the valve means is positioned in a tubular valve sleeve defining fluid distribution passages interconnecting the valve means and the respective chambers of the casing, through which the input member extends axially, the piston assembly incorporating a tubular hub sliding on the valve sleeve.

Other features and advantages of the present invention will emerge from the following description of an embodiment, given by way of illustration but not in any way limiting, with reference to the accompanying drawings, in which:

FIG. 1 is a longitudinal section of a servomotor according to the invention;

FIG. 2 is a transverse section along the line II—II in FIG. 1.

The assistance servomotor according to the invention, advantageously of the vacuum type, conventionally consists of a casing 1 made up of two shells 2 and 3, joined peripherally, typically made of sheet metal, each incorporating an end wall 4,4' and an outer ring portion in the form of an outer hoop 5,5' which is substantially cylindrical, joined together by a crimped joint 6, so as to define in the casing 1 a sealed cavity in the assembled mounting configuration of the servomotor with the master cylinder (not shown) to which it is coupled. This internal cavity is divided into two chambers 7 and 8 by an assistance piston assembly 9 associated to a diaphragm 10 whose peripheral bead is trapped in the crimped joint 6 joining together the two shells 2 and 3 of the casing 1. Typically, the shell 3 is provided with a fitting for connection to a line connected to a vacuum source, the chamber 7 thus being the vacuum chamber of the casing.

The servomotor also incorporates a hollow tubular valve sleeve 11, in which a valve 12 of conventional construction is positioned, of the type, for example, described in U.S. Pat. No. 4,186,650 mentioned above, including a valve plunger 13 coupled directly to a rod 14 extending axially through the valve sleeve 11 and forming the input member of the servomotor, this rod 14 being intended to be connected to a brake pedal of the motor vehicle (not shown).

In accordance with the present invention, the output member 15 of the servomotor, in line with the input member 14, comprises, besides the conventional rod 16 for connection to the piston of a master cylinder (not shown) intended to be mounted on the end wall 4' of the shell 3 of the casing 1, a cylindrical body portion in the shape of a cup whose base cooperates with a reaction disc 170 interposed between the output member and the valve plunger 13. In the example shown, the reaction disc 170 is mounted in a small cup 18, firmly fixed to the portion of the rod 16 and extending axially away from the rod 16, the peripheral wall of the small cup 18 being received into an axial annular groove 19 in the central hub, within which is slidably received the plunger 13 of the valve means 12. The valve sleeve 11 also incorporates a passage 20 connecting the valve means 12 to the vacuum chamber 7 and a passage 21 connecting the valve means 12 to the other chamber 8 of the casing 1. The end of the valve sleeve 11 terminates at the end opposite the rod 14 in a tubular body portion.

In accordance with the invention, the valve hub 11 defines over the greater part of its length an external cylindrical bearing surface 22 with which cooperates in sealed sliding relationship an annular seal 23 carried in a rear tubular extension 24 of reduced diameter of the rear shell 2. According to a feature of the invention, the piston assembly 9 comprises a tubular hub 25 extending axially rearwards and incorporating a central bore defining an internal bearing surface 26 cooperating in sealed sliding relationship with the peripheral wall 27 of enlarged diameter of the front end of the sleeve 11 which is provided with an annular seal 28. The rear end of the tubular hub 25 of the piston assembly incorporates an annular end wall 29 extending radially inwards, slidably bearing on the external peripheral bearing surface 22 of the valve hub 11. The valve plunger 13 is provided conventionally, in its middle zone, with an annular groove 30 receiving one end of a key 31 inserted radially into the front part of the valve hub 11 in the region of the passage 21, as described, for example, in French Patent Application No. 82-14388 in the name of the applicant company. An opening 32 is consequently provided in the end wall 29 of the tubular hub 25 of the piston assembly 9 to allow communication between the passage 21 and the chamber 8. In the example shown, the return travel (after actuation) of the tubular hub 11 is limited by a key 33 mounted on the sleeve 11 and coming to bear against a radial shoulder 34 formed by the rear tubular extension 24 of the shell 4 in front of the seal 23. The key 33 thus forms simultaneously a return stop abutment for the piston assembly 9 by cooperating with the outer face of the annular end wall 29 under the biasing force of the piston assembly return spring 35 positioned between the end wall 4' of the shell 3 and internal ribs 36 of the body portion of the piston assembly 9. As a variant, the key 31 of the valve plunger 13 may be extended radially outwards through an opening in the tubular hub 25 of the piston assembly 9 to cooperate in abutment with the annular end wall 4 of the shell 2, the seal 28 then being carried on the piston assembly 9.

In accordance with the invention, the force amplification system between the piston assembly 9 and the output member 15 consists of at least one, preferably three angularly spaced, elongate flexible members 40 whose opposite ends 41 and 42 are firmly fixed to the end wall 4' of the shell 3 and to the piston assembly 9, respectively. In the example shown, the annular end wall 4' of the shell 3 is provided with a central annular reinforcement member 43 through which the screws 44 pass for assembling the master cylinder on this shell 3 of the casing 1. The annular reinforcement member 43 incorporates, for mounting each end 41 of the elongate components 40, two lugs 45 extending axially inwards in which is mounted transversally a pin 46 provided with a diametral slot through which the end 41 of the flexible elongate member 40 is engaged. In a similar way, the body portion of the piston assembly 9 incorporates for each elongate flexible member 40, an arm 47, extending axially, projecting away from the tubular hub 25, and thus towards the end wall 4' of the shell 3, the arm 47 terminating in two parallel lugs in the form of a fork 48 in which a shaft 49 is mounted transversally, which is also provided with a diametral slot in which the corresponding end 42 of the flexible member 40 is engaged. In practice, the flexible member 40 consists of a band or strap of metal or of a plastic material with a high tensile strength. The body portion in the form of a tube 17 of the tubular hub 11 incorporates peripherally, for each band 40, two parallel tabs 50 extending radially outwards, positioned at the front end of the body portion 17 and between which extends transversally a return or angle changing roller 51 which is able to rotate. As may be seen in the drawings, the diameter of the internal bore 26 of the tubular hub 25 (and therefore the outside diameter 27 of the front portion of the valve sleeve 11) is greater than the outside diameter of the body portion in the form of a tube 17 of the tubular hub 11. Moreover, in the rest or retracted abutment position of the movable assembly shown in FIG. 1, the shaft 49 is positioned beyond the roller 51, that is to say slightly in front axially of the roller, between the latter and the fixing pin 46 of the other 41 of the band 40. This band 40 is thus permanently tensioned and partially folded back around the roller 51, the tension in the band 40 being adjusted, for example, by rotating the pin 46. It is thus understood, that, by exerting a braking application force on the input rod 14, the valve 12 will isolate the chamber 8 from the vacuum chamber 7 and admit in a second step into this chamber 8 the atmospheric pressure existing inside the end portion of the valve sleeve 11 so as to create a pressure differential on either side of the piston assembly 9 which accordingly pushes the latter in the direction of actuation of the rod 14, against the return spring 35, that is to say by moving the end 42 of the band 40 towards the other end 41 of the band anchored on the front end wall 4', and driving as a result, via the roller 51 and the tubular hub 11, the output member 15 with the desired amplification of force; the nominal travel L of the piston assembly 9 is approximately double the nominal travel l of the output member 15,16 such as is required for the full actuation of the pistons of the master cylinder. It is understood that the force amplification resulting from the reaction force induced on the roller 51 by putting the strands of the straps 40 under tension consequently allows the diameter of the servomotor to be reduced and, thus, largely to limit the likelihood of deflection by distortion of the front walls 4 and 4' of the casing shells whose outer ring portions 5 and 5', operating in pure tension, are not for their part subject to any significant axial distortion. In the assembled position, the output member 15 is normally held in face contact against the reaction component 170 by the piston springs of the master cylinder. An additional return spring 171 is advantageously provided between the tubular hub 11 and the end wall 4' or its central annular reinforcement member 43. In the conventional manner, fixing screws 52 are provided on the end wall 4 of the rear shell 2 for mounting the casing/master cylinder assembly onto a fixed wall of the vehicle, and an internal annular reinforcement member, similar to the reinforcement member 43, may also be provided for this purpose.

In an alternative embodiment which is not shown, the tubular hub 25 is turned so as to extend in the direction towards the body portion in the form of a tube 17, and slides on the latter. In this embodiment the tubular hub 25 has cut-outs spaced circumferentially to enable the tabs 50 to pass, the seal 28 then being carried in the tubular hub 25.

Although the present invention has been described relative to particular embodiments, it is not limited by them, but on the contrary is capable of modifications and variants which will be apparent to a person versed in the art.

I claim:

1. A braking assistance servomotor which comprises a casing, an assistance piston assembly displaceable in the casing and dividing the casing into two chambers, an output member actuatable by the piston assembly, an input member, and an articulated force amplification system connecting the piston assembly to the output member, characterized in that the force amplification system comprises at least one flexible elongate member having opposite ends fixed to the piston assembly and to the casing, respectively, and turned by partially folding back around a return component connected to a valve sleeve cooperating with the output member, valve means being arranged in said valve sleeve which forms fluid distribution passages connecting respectively said valve means and said chambers of the casing, and through which said input member extends axially, said piston assembly incorporating a tubular hub sliding on said valve sleeve.

2. The servomotor according to claim 1, characterized in that a first end of the flexible elongate member is fixed to a front zone of the casing and a second end fixed to a projecting portion of the piston assembly, the projecting portion normally extending axially toward said front zone of the casing and beyond the return component in a rest position of the servomotor.

3. The servomotor according to claim 2, characterized in that the servomotor includes a resilient return component between the front zone of the casing and the valve sleeve.

4. The servomotor according to claim 1, characterized in that the valve sleeve forms a sealed sliding bearing surface cooperating with a bore of the tubular hub of the piston assembly.

5. The servomotor according to claim 4, characterized in that a body portion of the valve sleeve has an external diameter smaller than the internal diameter of the bore of the tubular hub.

6. The servomotor according to claim 1, characterized in that the valve sleeve incorporates a cylindrical body portion carrying the return component.

7. The servomotor according to claim 1, characterized in that the force amplification system includes three angularly spaced flexible rectangular members.

8. A braking assistance service motor which comprises a casing, an assistance piston assembly displaceable in the casing and dividing the casing into two chambers, an output member actuable by the piston assembly, an input member, and an articulated force amplification system connecting the piston assembly to the output member, characterized in that the force amplification system comprises at least one flexible elongate member having opposite ends fixed to the piston assembly and to the casing, respectively, and turned by partially folding back around a return component connected to a valve sleeve cooperating with the output member, the flexible elongate member comprising a strap having a first end fixed to a front zone of the casing by being housed in a slot of a shaft member secured to said front zone, the shaft member mounted on a fork fixed to a central annular reinforcing component of an end wall of the casing, and a second end fixed to a projecting portion of the piston assembly by being housed in a slot in a shaft member secured to said piston assembly, the projecting portion normally extending axially toward said front zone and beyond the return component in an inactive position of the servomotor.

9. A braking assistance servomotor comprising:
a casing having a front shell and a rear shell;
an assistance piston assembly dividing the casing into a front chamber and a rear chamber and displaceable in said casing upon actuation by an input member of valve means housed in a valve sleeve connected to an output member, the improvement wherein said piston assembly is sealingly and slidingly mounted on said valve sleeve, and further comprising at least one flexible elongated force transmitting member having one end fixed to the casing and an opposite end fixed to said piston assembly and turned by partially folding back around a return component supported on the valve sleeve.

10. A servomotor according to claim 9, wherein said flexible elongated force transmitting member is arranged within said front chamber, and has the one end secured to said front shell, said return component being supported on a tubular end portion of said valve sleeve which extends within said front chamber.

11. A servomotor according to claim 10, wherein said one end of said flexible elongated force transmitting member is connected to an annular reinforcement member secured internally to said front shell.

12. A servomotor according to claim 10, wherein said opposite end of said flexible elongated force transmitting member is connected to a projecting portion of the piston assembly, the projecting portion extending axially within said front chamber beyond said return component in a rest position of the servomotor.

13. A servomotor according to claim 10, wherein said valve sleeve comprises an intermediate portion of enlarged diameter with which said piston assembly sealingly and slidingly cooperates.

* * * * *